(12) United States Patent
Simske et al.

(10) Patent No.: US 8,687,241 B2
(45) Date of Patent: Apr. 1, 2014

(54) METHOD FOR SECURITY PRINTING

(75) Inventors: Steven J. Simske, Fort Collins, CO (US); Malgorzata M. Sturgill, Fort Collins, CO (US); Jason S. Aronoff, Fort Collins, CO (US); Juan C. Villa, Aguadilla, PR (US); Galia Golodetz, Rehovot (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 1493 days.

(21) Appl. No.: 11/810,743

(22) Filed: Jun. 6, 2007

(65) Prior Publication Data
US 2008/0304110 A1 Dec. 11, 2008

(51) Int. Cl.
*H04N 1/40* (2006.01)
*G06K 15/00* (2006.01)

(52) U.S. Cl.
USPC ........... 358/3.28; 358/1.14; 358/1.9; 358/1.2; 358/2.1; 358/3.12; 380/55; 382/100; 382/101; 382/135; 382/174; 382/176

(58) Field of Classification Search
USPC ............................................................ 380/55
See application file for complete search history.

(56) References Cited

U.S. PATENT DOCUMENTS

| | | | | |
|---|---|---|---|---|
| 5,289,547 | A * | 2/1994 | Ligas et al. ..................... | 283/72 |
| 5,850,080 | A * | 12/1998 | Herzig .......................... | 235/494 |
| 2003/0058477 | A1* | 3/2003 | Brunk et al. ................... | 358/3.28 |
| 2005/0041835 | A1* | 2/2005 | Reed et al. .................... | 382/100 |
| 2006/0017957 | A1* | 1/2006 | Degott et al. ................. | 358/1.14 |
| 2007/0201720 | A1* | 8/2007 | Rodriguez et al. ........... | 382/100 |
| 2008/0259400 | A1* | 10/2008 | Hersch et al. ................. | 358/2.1 |

\* cited by examiner

*Primary Examiner* — Miya J Cato

(57) ABSTRACT

Method for security printing. A digital model of a feature for printing is received, wherein the feature is for authentication by an external device. Deviation from the digital model is compensated for, to a printed instance of the feature.

16 Claims, 6 Drawing Sheets

300

(a)

(b)

(c)

METHOD FOR SECURITY PRINTING

BACKGROUND

Producers and consumers of commercial goods are faced with a problem of counterfeit goods, or used goods that are packaged and sold, as if they were new. Counterfeiting and misrepresentation of a producer's product undermines a producer's reputation by having their name associated with substandard quality. A consumer is hurt by purchasing a substandard quality product. Both producer and consumer are hurt by loss of revenue and money.

BRIEF DESCRIPTION OF THE DRAWINGS

The accompanying drawings, which are incorporated in and form a part of this specification, illustrate embodiments of the invention and, together with the description, serve to explain the principles of the invention.

The drawings referred to in this description should not be understood as being drawn to scale except if specifically noted.

DESCRIPTION OF THE EMBODIMENTS

Various embodiments of the present invention, method for security printing, are described herein. In one embodiment, a digital model of a feature for printing is received. The feature is for authentication by an external device. Deviation from the digital model is compensated for, to a printed instance of the feature.

Reference will now be made in detail to the various embodiments of the invention, examples of which are illustrated in the accompanying drawings. While the invention will be described in conjunction with the various embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the various embodiments of the present invention, numerous specific details are set forth in order to provide a thorough understanding of the present invention. In other instances, well known methods, procedures, components, and circuits have not been described in detail as not to unnecessarily obscure aspects of the embodiments of the present invention.

Security printing for brand protection relies on the power of variable data printing (VDP) to provide difficult-to-reproduce overt features that are individually unique. These features or "deterrents" are authenticated after printing, usually by an image-capturing device and the appropriate analysis software. The breadth of image-capture devices is large, extending from low-resolution camera phones on the low-end to expensive bench-top scanners and vision systems on the high end. The devices will not have uniform capability for authentication, with the more expensive systems in general being capable of authenticating deterrents with finer detailed features. In accordance with embodiments of the present invention, closed-loop qualification and open-loop authentication serve as mechanisms for determining the means by which to compensate deterrents prior to their printing in order to: improve their subsequent ability to authenticate; tie their ability to authenticate to a specific printing process; and/or tie their ability to authenticate to a particular capture device/process. One or more compensation approaches can be used to make the printed feature more difficult and generally impractical for a counterfeiter to reproduce. These compensating approaches include structural, spectral and, thermochromic/fading.

Figure 1:
FIG. 1 is an example of a feature for authentication, upon which embodiments of the present invention can be practiced.

FIG. 1 illustrates examples of a feature for authentication, upon which embodiments of the present invention can be practiced. Five examples of 2D Data Matrix barcodes 100 are printed without the benefits of the embodiments of the present invention. Barcodes 100 experience glyph gain (which can be due to dot gain, ink spreading, etc.) Glyph is used throughout since the gain can be larger than the gain of a single dot, especially if the ink "runs" on the media before drying/curing] which typically expands the size of the features of deterrents, such as barcodes 100. Detail 200 exemplifies the glyph gain that can enlarge and reduce the resolution of features of deterrents, such as barcodes 100.

Figure 2:
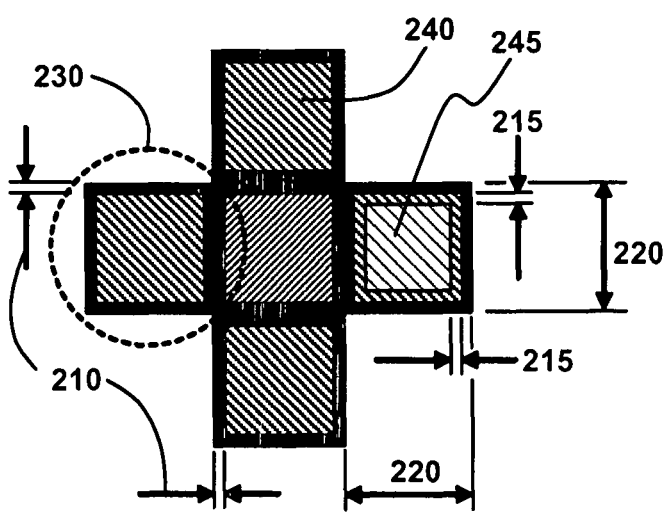
FIG. 2 is a detail of a feature for authentication, in accordance with an embodiment of the present invention.

With reference to FIG. 2 and in accordance with an embodiment of the present invention, the exemplary printed instances of the barcodes 100 in FIG. 1 experience growth beyond the designed borders of features of the deterrent, due to glyph gain of the particular print process. Since the features exemplified in FIG. 1 and FIG. 2, comprise rectilinear tiles 230, glyph gain results in horizontal and vertical glyph gain 210. In general, glyph gain increases a printed feature's size in all directions from the feature's center. For example, if tiles 230 were circular tiles, glyph gain would cause the circular tiles to grow approximately equally at each angle from the circular tiles' centers. The exemplary circular tile would expand radially by glyph gain 210.

Digital model 240 comprises an array of tiles 230 arranged in groups similar to detail 200. As an aggregate, tiles 230 comprise a code that can be coupled to an object and linked to a database. The resolution of digital model 240 is reduced by glyph gain 210 since the printed dimensions 220 are larger then digital model 240 by the size of glyph gain 210.

The following example of an embodiment of the present invention includes experimental data that illustrates the benefits of increased resolution. The following data also illustrates the dependency of the print media and the image-capture device used in implementing compensation in accordance with embodiments of the present invention.

Figure 3:
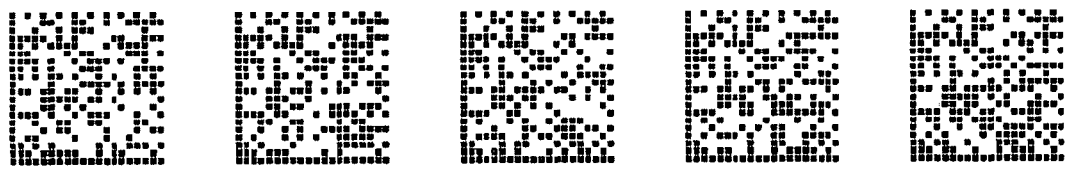
FIG. 3 is an example of a feature for authentication, in accordance with an embodiment of the present invention.

With reference to FIG. 3, features for authentication are shown in accordance with an embodiment of the present invention. Five examples of 2D Data Matrix barcodes 300 are printed with the benefits of embodiments of the present invention. Barcodes 300 are compensated for glyph gain. Clear borders are visible around individual tiles of barcodes 300. Referring to FIG. 2, and in accordance with an embodiment of the present invention, features in barcodes 300 more closely mimic digital model 240 by applying compensation 215 both horizontally and vertically to digital model 240 prior to printing. Compensation 215 is approximately equal in magnitude but in the opposite direction to glyph gain 210. For a circular glyph, it is achieved through a reduction of the radius. Glyph gain is a function of the printing device as well as other factors such as ink and print media. The magnitude of compensation 215 needed to achieve a required resolution for authentication of security feature is typically unknown to one who may desire to counterfeit a security feature. To generate this knowledge would require a substantial investment and time on the part of a would-be counterfeiter. Thus embodiments of the present invention act as deterrents against such activity.

In accordance with various embodiments of the preset invention, compensating a security feature for identification, results in smaller features that can be resolved. In accordance with an embodiment of the present invention, more information can be stored in a security feature, such as a 2D Data Matrix bar code, by characterizing the glyph gain for a print system, such as the Indigo Press from Hewlett-Packard, and compensating the digital model prior to printing. By designing the digital model to contain more information, in accordance with embodiments of the present invention, false authentication of counterfeited security feature becomes less likely.

One example of a typical manner in which security features are counterfeited is by copying a security feature using any number of copying means available on the market. The copying process causes features to bloom, similar to that of glyph gain. Copying a security feature decreases the security feature resolution and in so doing, increases the likeliness of a copied security feature failing authentication.

Figure 4:
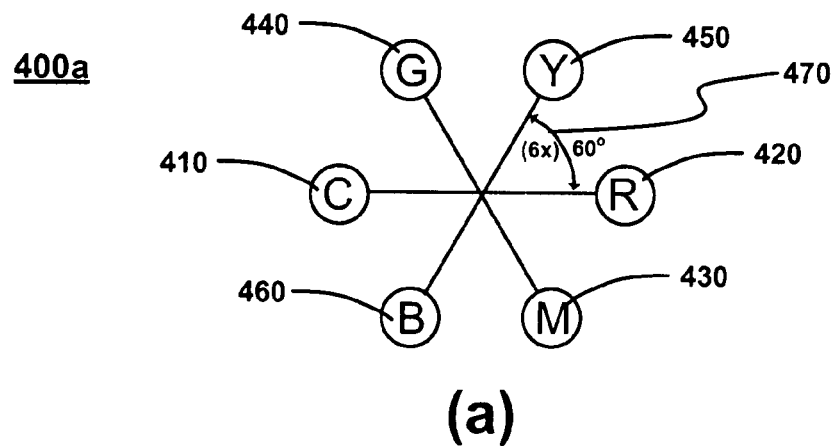
FIG. 4A is a digital model of a color feature for authentication, in accordance with an embodiment of the present invention.
FIG. 4B is a print instance color shift of a color feature for authentication, in accordance with an embodiment of the present invention.
FIG. 4C is a compensation of a color feature for authentication, in accordance with an embodiment of the present invention.
Figure 4:
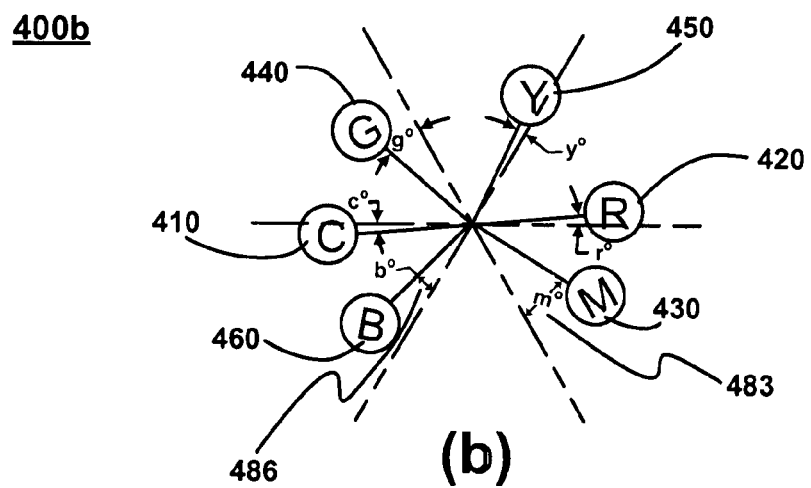
Figure 4:
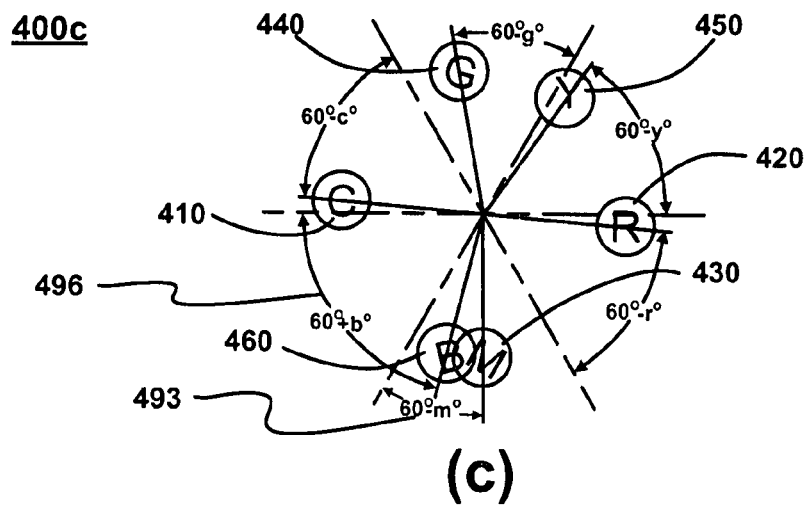

FIG. 4A is digital model 400*a* of a color security feature for authentication, in accordance with an embodiment of the present invention. Primary colors red, green, and blue are presented as R 420, G 440, and B 460. Secondary colors cyan, magenta, and yellow are presented as C 410, M 430, and Y 450. All colors 410, 420, 430, 440, 450, and 460 are of equal hue and intensity as shown in digital model 400*a* by equal separation angle 470 between all colors. Upon a printed instance of digital model 400*a*, a color shift occurs whereby angle 470 between colors is no longer equal.

FIG. 4B is a print instance color shift 400*b*, of a color security feature for authentication, in accordance with an embodiment of the present invention. The separation angle between colors 410, 420, 430, 440, 450, and 460 will usually shift in the process of print instance 400*b*. Separation angles 483 and 486 exemplify a positive and negative shift in separation angle; angle 483 being positive shift in separation angle for M 430 and angle 486 being negative shift in separation angle for B 460. In accordance with an embodiment of the present invention, shift in separation colors such as 483 and 486 are characterized for the printing means intended for printing a color feature for authentication. Compensation is derived for each of the colors 410, 420, 430, 440, 450, and 460.

FIG. 4C is compensation 400*c*, of a color feature for authentication, in accordance with an embodiment of the present invention. Upon analysis of color shift of print instance 400*b*, compensation for colors 410, 420, 430, 440, 450, and 460 is derived and delivered to a repository for holding modifications to digital model 400*a*. Compensation comprises shifting separation angles for colors 410, 420, 430, 440, 450, and 460. For example, M 430 is compensated with the subtraction of separation shift angle 483 resulting in compensation angle 493. B 460 is compensated with the addition of separation shift angle 486 resulting in compensation angle 496.

In accordance with another embodiment of the present invention, colors used for printing a security authentication feature intentionally fade at a predetermined rate. The rate at which the colors fade is linked to the age of the item to which the security authentication feature is coupled.

An example in accordance with an embodiment of the present invention is when one color ink, e.g. yellow, fades in response to exposure to the environment, such as time in temperature and humidity. Upon yellow fading, the security authentication feature, such as color tiles, will look different. Depending upon the color of the substrate, yellow will assume a color that resembles the substrate upon which the color tiles are printed. To authenticate that the exemplary color tiles have faded to a corresponding age, a template of colors, altered from the original palette for generating the color tiles, is used in the authentication device.

Table 1 below presents the effects of yellow ink fading from a palette of six colors: red, green, blue, cyan, magenta, and yellow. When yellow fades completely, the colors in Table 1 move from:

TABLE 1

|  | Cyan | Magenta | Yellow |
| --- | --- | --- | --- |
| Red | 0 | 255 | 255 |
| Green | 255 | 0 | 255 |
| Blue | 255 | 255 | 0 |
| Cyan | 255 | 0 | 0 |
| Magenta | 0 | 255 | 0 |
| Yellow | 0 | 0 | 255 | to the colors in Table 2:

TABLE 2

|  | Cyan | Magenta | Yellow |
| --- | --- | --- | --- |
| Red | 0 | 255 | 0 |
| Green | 255 | 0 | 0 |
| Blue | 255 | 255 | 0 |
| Cyan | 255 | 0 | 0 |
| Magenta | 0 | 255 | 0 |
| Yellow | 0 | 0 | 0 |

Table 2 shows that red becomes magenta, green becomes cyan, blue is unchanged and yellow assumes the color of the substrate upon which the color tiles are printed.

In this exemplary color tile security feature, the substrate is white. The original pallet of six colors has now faded to a palette of four colors comprising blue, magenta, cyan and an emerging white. The emerging white is a color that is not present in the original un-faded color tile palette. Signifying the colors by their first initial, the color palette used to generate the color tiles is RGBCMY. By using two different color templates of RGBCMY and MCBW, the exemplary color tile will fail the RGBCMY template for not being old enough, but will authenticate with the MCBW template as being faded, probably due to age.

It should be appreciated that variations on authenticating templates are required to address the varying degrees of various color fading, and instances where color tiles are printed on a substrate other than white (W). For example, given a color tile generated from a palette with RGBRGCMYB, an authentication device using an authentication template of RGBRGCMYB would not authenticate the exemplary color tile if the color tile is partially faded and yellow (Y), the color fading, is ambiguous. One skilled in the art will appreciate the need for additional templates for the exemplary color tile security device having been generated with a palette of RGBRGCMYB. For example, a color tile using a palette of RGBRGCMYB with varying degrees of fading will need the following registration templates for passing authentication:

MCBMCCMWB, wherein Y has completed faded on a white (W) substrate;

MCBMCCMYB, wherein Y has faded, but does not substitute W for Y;

MCBMCCMRB, wherein Y has faded but authenticates as R;

MCBMCCMGB, wherein Y has faded but authenticates as G;

MCBMCCMBB, wherein Y has faded but authenticates as B;

MCBMCCMCB, wherein Y has faded but authenticates as C; and

MCBMCCMMB, wherein Y has faded but authenticates as M.

Figure 5:
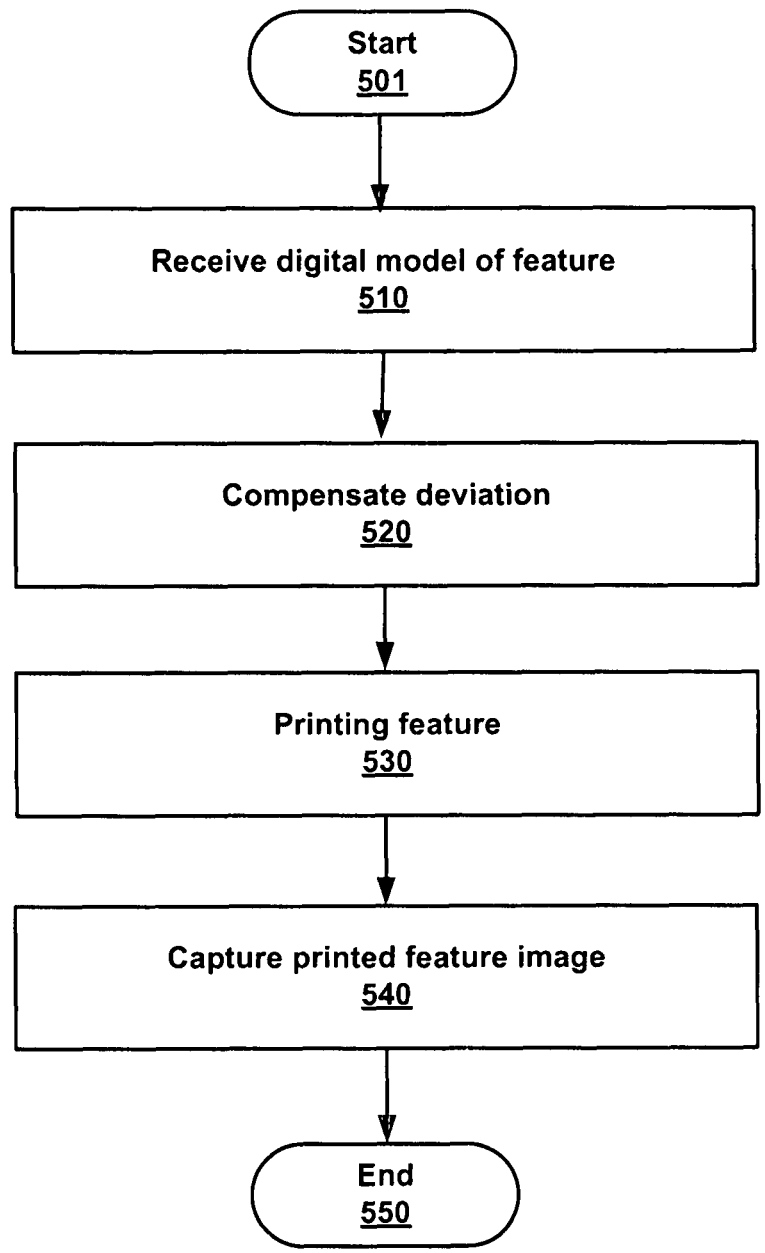
FIG. 5 is a flow chart illustrating a process for security printing a feature, in accordance with an embodiment of the present invention.

FIG. 5 is a flow chart illustrating process 500 for security printing a feature, in accordance with an embodiment of the present invention. In one embodiment, process 500 is carried out by processors and electrical components under the control of computer readable and computer executable instructions. The computer readable and computer executable instructions reside, for example, in data storage features such as computer usable volatile and non-volatile memory. However, the computer readable and computer executable instructions may reside in any type of computer readable medium. Although specific components are disclosed in process 500, such components are exemplary. That is, the embodiments of the present invention are well suited to performing various other components or variations of the components recited in FIG. 5. Within the present embodiment, it should be appreciated that the components of process 500 may be performed by software, by hardware, by an assembly mechanism, through human interaction, or by any combination of software, hardware, assembly mechanism, and human interaction.

In one embodiment, as shown at 501 of process 500, process 500 starts with a design of a digital model for printing a security feature. The security feature is for authentication by an external device such as a bar code reader or character recognition system. A density of printed information (the data capacity per unit area within the deterrent or feature) is chosen and designed into the digital model such that it will coincide with a capability of an external authentication device.

In one embodiment, as shown at 510 of process 500, a digital model of the security feature is received. The digital model is encoded to be readable by an appropriate print system such as an Indigo Press. The digital model is encoded to be read by any number of printer control language well known in the art such as HPGL, DWG, DXF and PDF.

In one embodiment, as shown at 520 of process 500, anticipated deviation from the digital model to a printed instance of the security feature is compensated. To identify the compensation required, a print instance of the security feature or similar feature is produced. Producing a print instance is performed on a substrate that replicates the actual substrate upon which the security feature will be printed. In addition to printing on a representative substrate, a representative authentication device is used to assure that the proper compensation has been identified and the intended authentication device can read the security feature at an acceptable level of accuracy.

In accordance with an embodiment of the present invention, compensation comprises adjusting at least one dimension of a security feature such that when a print instance is executed, the security feature is printed away from deviation such as that caused by glyph gain and substrate texture. Adjusting comprises predicting the amount of glyph gain for at least one dimension that deviates from a digital model and reducing the glyphs to a printed instance of the security feature.

In another embodiment, compensating comprises adjusting to a color of the security feature based on a print instance and the deviation of the color from the digital model. Depending upon the ink color, type of ink, substrate and environmental printing conditions, a color of the security feature may require an addition or subtraction of a pigment to achieve the desired compensation. A color change is predicted from the color of the security feature and the digital model. Color pigmentation is selected according to the predicted color change of a print instance of the security feature.

In accordance with another embodiment of the present invention, a color pigment is selected to couple the rate of a color change to an age of a printed instance of the security feature. As an example and in accordance with an embodiment of the present invention, a color ink, e.g. yellow, fades in response to exposure to the environment, such as time of exposure to temperature and humidity. Upon yellow fading, the security authentication feature, such as color tiles, will look different. Depending upon the color of the substrate, yellow will assume a color that resembles the substrate upon which the color tiles are printed. To authenticate that the exemplary color tiles have faded to a corresponding age, a template of colors, altered from the original palette for generating the color tiles, is used in the authentication device.

In one embodiment, as shown at 530 of process 500, a security feature is printed. There exist a plethora of print devices available that are in accordance with embodiments of the present invention. Examples of the types of printing means available are electrostatic, laser jet, inkjet, and offset. The printing means used in embodiments of the present invention does not limit the scope of the embodiment.

In one embodiment, as shown at 540 of process 500, a printed security feature image is captured by an external authentication device such as a bar code reader or character recognition system. The gamut of image capture devices is large, extending from low-resolution camera phones on the low-end to expensive bench-top scanners and vision systems on the high end. The devices will not have uniform capability for authentication, with the more expensive systems in general being capable of authenticating security features with finer resolution.

In one embodiment, as shown at 550 of process 500, a digital model of a security feature has been compensated, printed, and rendered secure against counterfeiting. The required development time and expense for a prospective counterfeiter to subvert the embodiments of the present invention are a purposeful deterrent against unlawful use, reuse and/or re-creation of security features in this embodiment.

Figure 6:
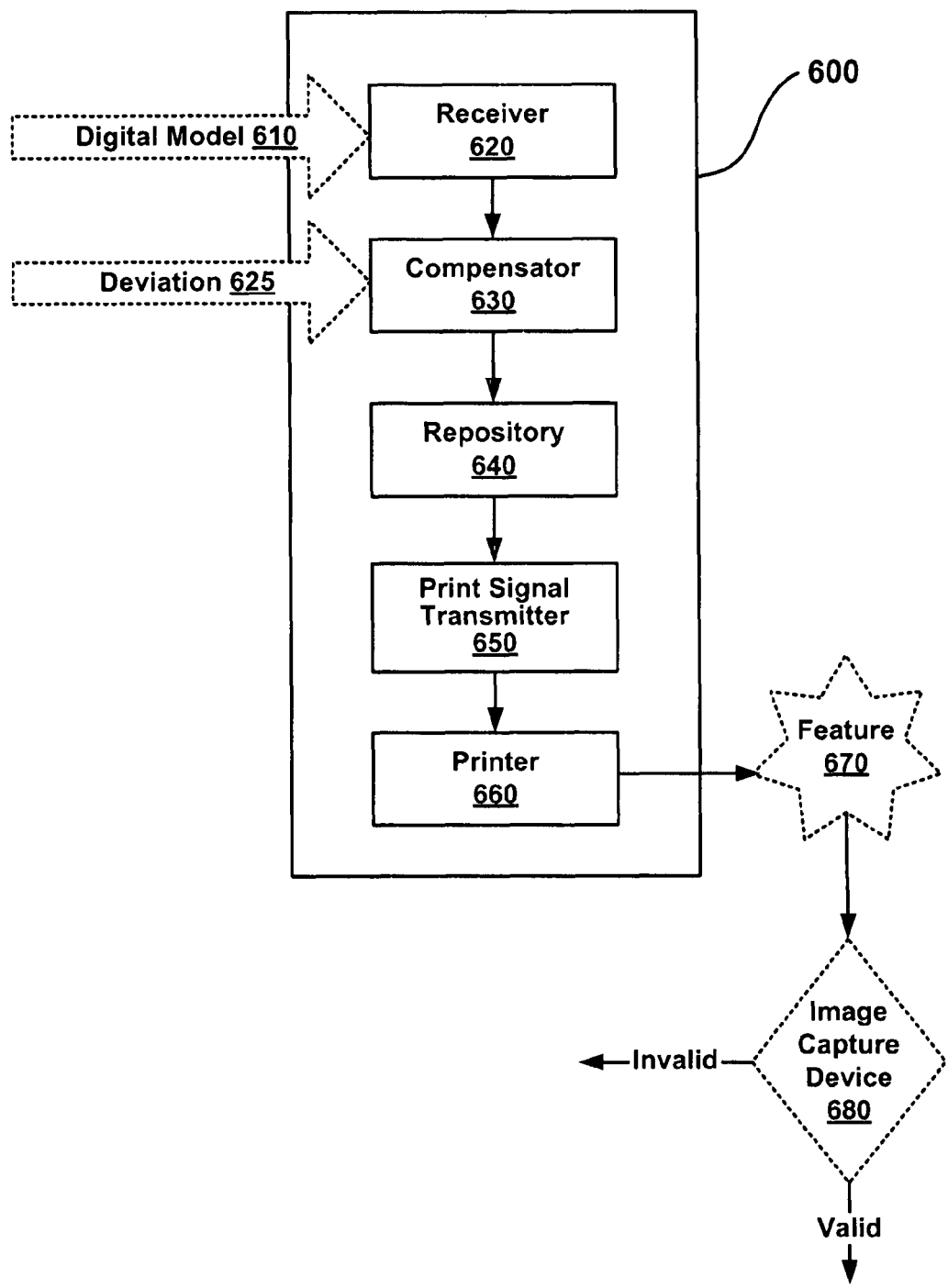
FIG. 6 is block diagram illustrating a system for security printing, in accordance with an embodiment of the present invention.

FIG. 6 is a block diagram illustrating system 600 for security printing, in accordance with an embodiment of the present invention. Method 600 comprises: a receiver 620 for receiving a digital model of a printable feature for authentication by an external device; a compensator 630 for modifying a deviation from the digital model to a printed instance of the printable feature; a repository 640 for holding a modification from compensator 630; a print signal transmitter 650 for transmitting the modification of generated by compensator 630, which were held by repository 640; and printer 660 for printing a security feature.

In one embodiment, receiver 620 receives digital model 610. Receiver 620 is any number of means that are operable to receiving digital information, such as a receiver coupled to a client device, and a website configured to receive incoming digital information, and a telecommunications module configured to receive and translate pulsed or tone signals into digital commands.

In accordance with an embodiment of the present invention, compensator 630 receives digital model 610 from receiver 620. Compensator 630 couples digital model 610 with deviation 625, which it receives from an external source. Deviation 625 is generated empirically by comparing digital model 610 to a print instance, which is generated under similar conditions for printing the security feature whose design is based on digital model 610.

Producing a print instance is performed on a substrate that replicates the substrate upon which the security feature will be printed. Deviation 625 between the print instance and digital model 610 is measured and provided to compensator 630.

In accordance with an embodiment of the present invention, compensator 630 adjusts at least one dimension of a security feature such that when a print instance is executed, the security feature is printed away from deviation such as that caused by glyph gain and substrate texture. Compensator 630 predicts the amount of glyph gain for at least one dimension that deviates from digital model 610 and reduces the glyphs to a printed instance of the security feature.

In another embodiment, compensator 630 adjusts a color of the security feature such that when a print instance is executed, the security feature is printed away from the color shift experienced between the print instance and digital model 610. Depending upon the ink color, type of ink, substrate and environmental printing conditions, compensator 630 may add or subtract a pigment to achieve a desired compensation.

In accordance with another embodiment, compensator 630 selects a color pigment to couple the rate of a color change to an age of a printed instance of the security feature. As an example and in accordance with an embodiment of the present invention, a color ink, e.g. yellow, fades in response to exposure to the environment, such as time of exposure to temperature and humidity.

In accordance with an embodiment of the present invention, repository 640 receives and holds modifications from compensator 630 for compensating digital model 610. In one embodiment repository 640 is a modified digital model that comprises digital model 610 coupled to a modification derived by compensator 630. In another embodiment, repository 640 is a compensated print command that is operable to driving a printer for printing a security authentication feature.

In one embodiment, print signal transmitter 650 is coupled to repository 640, whereby modification, adjustment, and/or compensation are operably transmitted for printing a security authentication feature.

In accordance with another embodiment of the present invention, printer 660 is part of system 600 for security printing. Printer 660 is operable to printing security authentication feature 670 onto a surface. There exist a plethora of print devices available that are in accordance with embodiments of the present invention. Examples of the types of printing means available are electrostatic, laser jet, inkjet, and offset. The printing means used in embodiments of the present invention does not limit the scope of the embodiment.

Printer 660 prints security authentication feature 670 with compensation based on digital model 610 and deviation 625. Once printed, security authentication feature 670 is operable for scanning and authentication by image capture device 680. System 600 is dependent upon the glyph gain and color shift characteristics of printer 660 as well as the resolution capabilities of image capture device 680. The field of image-capture devices is large, extending from low-resolution camera phones on the low-end to expensive bench-top scanners and vision systems on the high end.

Various embodiments of the present invention provide a method for printing a security authentication feature whereby the feature is for authentication by an external device. The method allows for receiving a digital model of a feature for printing and the digital model is compensated for deviations to a printed instance of the security authentication feature. Compensations comprise structurally changing the digital model so that the security authentication feature when printed has a better match to the expected architecture of the deterrent/feature, which is capable of containing more authentication data. Compensation also comprises shifting color hues and intensity of the digital model such that when printed, the print instance more closely mimics the digital model. Compensation also comprises printing with ink pigments whose rate of fading can be coupled to the age of the item to which it is associated. Fraudulent copying or reuse of security authentication features presented in embodiments of the present invention will cause the authentication process to reject the fraudulent feature.

Various embodiments of the present invention present a deterrent for counterfeiting and misusing security authentication features. The time and investment required for a potential counterfeiter to defeat or circumvent the presented embodiments present barriers for fraudulent use of security authentication features.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method for security printing, said method comprising:
   receiving a digital model of a feature for printing, wherein said feature for printing is configured to be visible by reflecting visible light and wherein said feature is for authentication by an external device; and
   compensating for deviation from said digital model to a printed instance of said feature, wherein said compensating for deviation comprises:
      predicting a glyph gain for at least two physical dimensions of said digital model, wherein said glyph gain increases a size of said feature in all directions from a center of said feature, wherein said glyph gain is a function of a printing device, ink and print media, said predicting said glyph gain comprises:

producing a print instance of said feature on a representative substrate to identify compensation required for said compensating for said deviation; and reducing said feature by said predicted glyph gain of said at least two physical dimensions.

2. The method as recited in claim 1 wherein said compensating comprises adjusting to a color of said feature.

3. The method as recited in claim 2 wherein said adjusting to a color further comprising:
predicting a color change from said color of said feature of said digital model; and
selecting color pigmentation according to a color change to a print instance of said feature.

4. The method as recited in claim 3 wherein said selecting color pigmentation comprises coupling the rate of said color change to an age of said printed instance of said feature.

5. The method as recited in claim 1 further comprising:
printing said feature onto a surface.

6. The method as recited in claim 1 wherein said external device comprises an image capture device for capturing said printed instance of said feature.

7. A computer-readable memory containing executable instructions wherein said instructions when executed effect a method for security printing, said method comprising:
receiving a digital model of a feature for printing, wherein said feature for printing is configured to be visible by reflecting visible light and wherein said feature is for authentication by an external device; and
compensating for deviation from said digital model to a printed instance of said feature, wherein said compensating for deviation comprises:
predicting a glyph gain for at least two physical dimensions of said digital model, wherein said glyph gain increases a size of said feature in all directions from a center of said feature, wherein said glyph gain is a function of a printing device, ink and print media, said predicting said glyph gain comprises:
producing a print instance of said feature on a representative substrate to identify compensation required for said compensating for said deviation; and
reducing said feature by said predicted glyph gain of said at least two physical dimensions.

8. The computer readable memory as described in claim 7 wherein said compensating comprises adjusting to a color of said feature.

9. The computer readable memory as described in claim 7 further comprising:
printing said feature onto a surface.

10. The computer readable memory as described in claim 7 wherein said external device comprises an image capture device for capturing said printed instance of said feature.

11. The computer readable memory as described in claim 7 wherein said adjusting to a color further comprising:
predicting a color change from said color of said feature of said digital model; and
selecting color pigmentation according to a color change to said printed instance of said feature.

12. The computer readable memory as described in claim 11 wherein said selecting color pigmentation comprises coupling the rate of said color change to an age of said printed instance of said feature.

13. A security printing system comprising:
a receiver for receiving a digital model of a printable feature, wherein said printable feature is configured to be visible by reflecting visible light wherein said feature is for authentication by an external device;
a compensator for modifying a deviation from said digital model to a printed instance of said feature, wherein said compensator is further configured for predicting a glyph gain for at least two physical dimensions of said digital model of a printable features and reducing said printable feature by said predicted glyph gain for said at least two physical dimensions, wherein said glyph gain increases a size of said feature in all directions from a center of said feature, wherein said glyph gain is a function of a printing device, ink and print media, and wherein said predicting produces a print instance of said feature on a representative substrate to identify compensation required for said compensating for said deviation; and
a print signal transmitter for transmitting said modification.

14. The system of claim 13 wherein said printing device is for printing said feature onto a surface.

15. The system of claim 13 further comprising:
a repository for holding a modification from said compensator wherein said repository comprises a modified digital model.

16. The system of claim 15 wherein said repository comprises a compensated print command.

* * * * *